United States Patent [19]

Dupuis et al.

[11] 3,970,882

[45] July 20, 1976

[54] CARBON BRUSH ASSEMBLY

[76] Inventors: Maurice Victor Dupuis, 8101 Manning, Raytown, Mo. 64138; Frederick William Hohman, 16130 Harbor Point Drive, Spring Lake, Mich. 49456

[22] Filed: Nov. 28, 1973

[21] Appl. No.: 419,651

Related U.S. Application Data

[62] Division of Ser. No. 302,918, Nov. 1, 1972, abandoned.

[52] U.S. Cl. .......... 310/245

[51] Int. Cl.[2] .......... H02K 13/00

[58] Field of Search .......... 310/245, 229, 246, 230, 310/247, 232, 248, 240, 249, 241, 239, 244, 219

[56] References Cited

UNITED STATES PATENTS

| | | | |
|---|---|---|---|
| 1,933,628 | 11/1933 | Kitto | 310/247 |
| 2,045,293 | 6/1936 | Carlson | 310/245 |
| 2,428,250 | 9/1947 | Thomas | 310/248 |
| 2,430,279 | 11/1947 | Duryee | 310/247 |
| 2,454,909 | 11/1948 | Bylund | 310/247 |
| 2,477,352 | 7/1949 | Stark | 310/247 |
| 2,482,921 | 9/1949 | Malchus | 310/247 |
| 2,536,958 | 1/1951 | Rudat | 310/247 |
| 2,748,302 | 5/1956 | Boeckel | 310/247 |
| 2,813,208 | 11/1957 | Ritter | 310/247 |
| 2,870,355 | 1/1959 | Rohrbach | 310/247 |
| 2,889,530 | 6/1959 | Straub | 310/247 |
| 2,987,639 | 6/1961 | Bayless | 310/247 |
| 2,991,379 | 7/1961 | Van Dam | 310/247 |
| 3,431,446 | 3/1969 | Petersen | 310/247 |

FOREIGN PATENTS OR APPLICATIONS

| | | | |
|---|---|---|---|
| 834,902 | 5/1960 | United Kingdom | 310/248 |

*Primary Examiner*—R. Skudy

*Attorney, Agent, or Firm*—Schmidt, Johnson, Hovey & Williams

[57] ABSTRACT

An electrically conductive helical spring has a series of closely spaced, inversely extending inner turns which receive and retain a mounting projection on a carbon brush to maintain excellent electrical continuity between the brush and the spring and to maximize the active length of the spring within the dimensional limitations of its normal mounting space.

6 Claims, 23 Drawing Figures

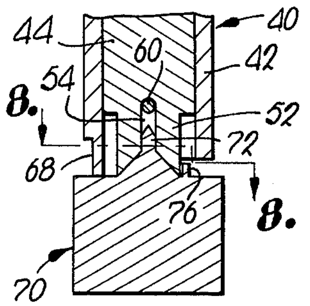
Fig.7.
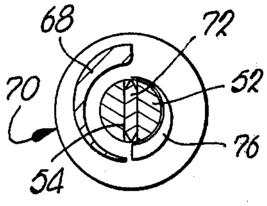
Fig.8.
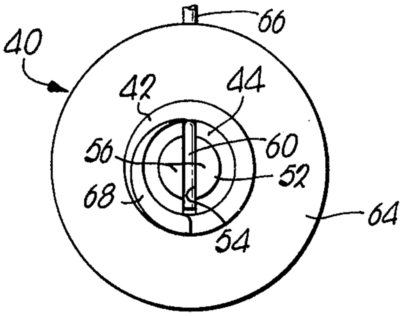
Fig.9.
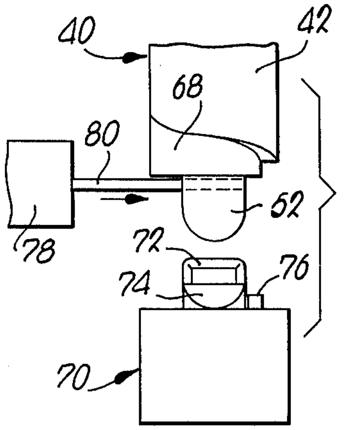
Fig.10.
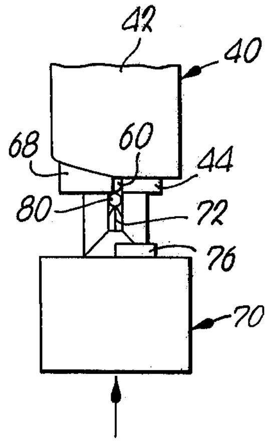
Fig.11.
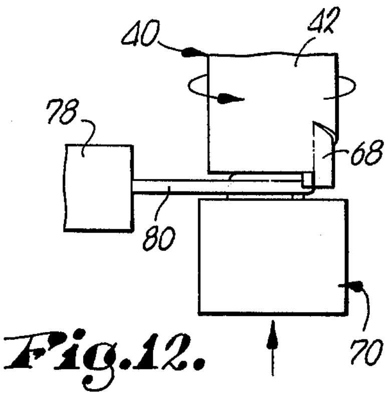
Fig.12.
Fig.12A.
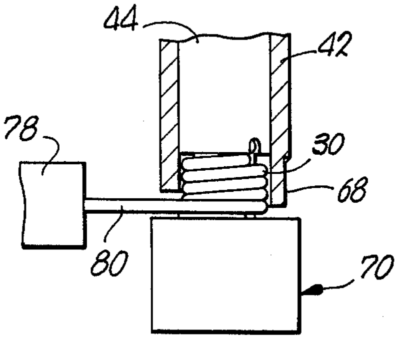
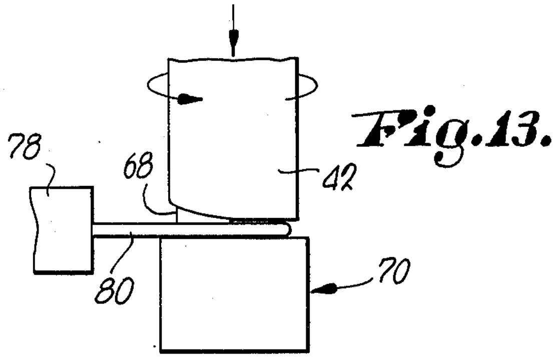
Fig.13.
Fig.12B.
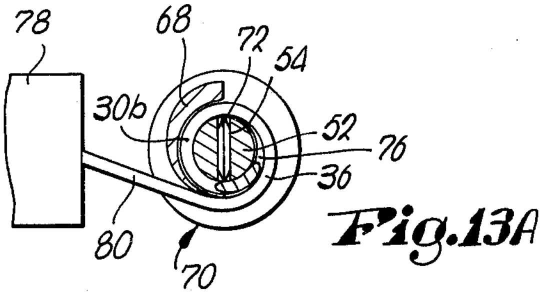
Fig.13A.
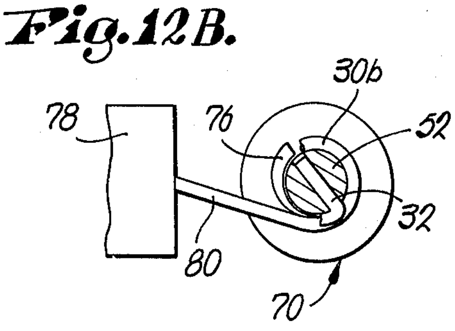

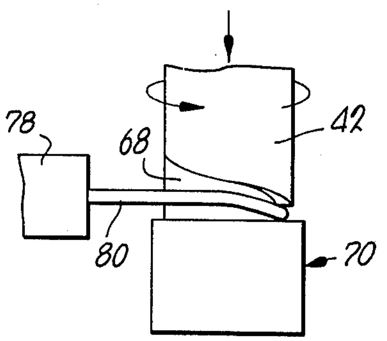
Fig.14.
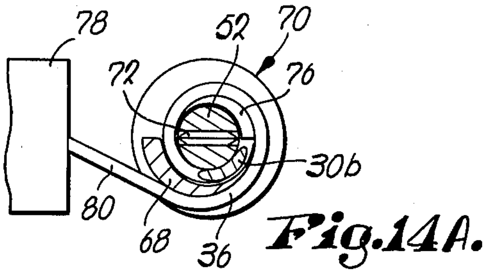
Fig.14A.
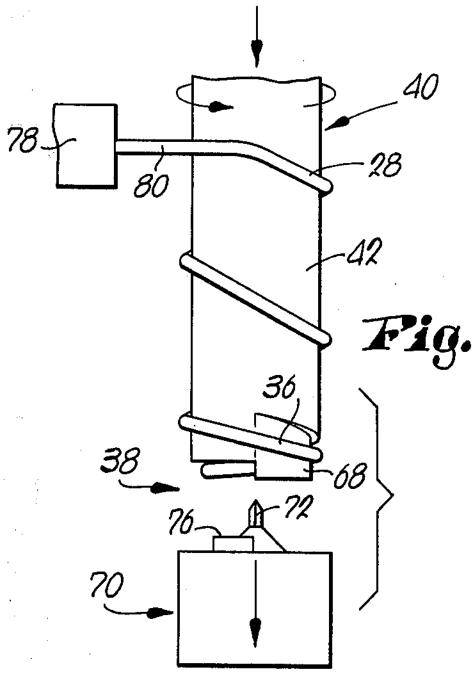
Fig.15.
Fig.17.
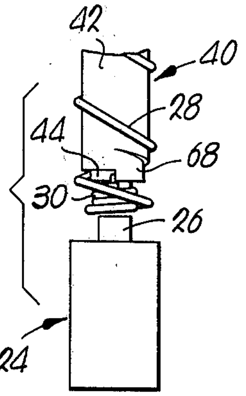
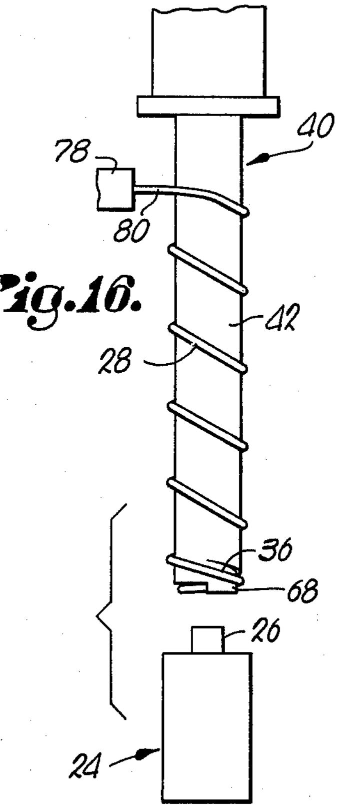
Fig.16.
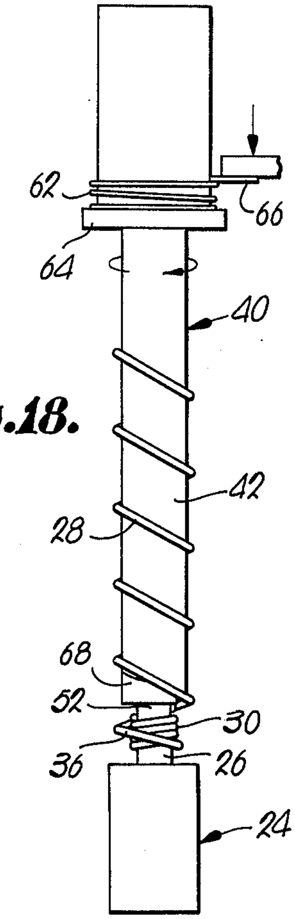
Fig.18.
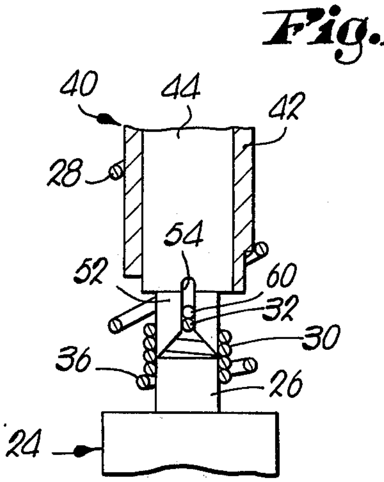
Fig.18A.

CARBON BRUSH ASSEMBLY

This is a division of application Ser. No. 302,918, filed 11-1-72, now abandoned.

This invention relates to an electrical carbon brush assembly for use in machines having rotary commutators, and especially pertains to an improved helical or coil spring as part of such assembly, including method and means for use in manufacturing the improved spring.

Brush assemblies have taken several different forms in the past, but typically employ a carbon brush which bears against the commutator of a machine and a helical spring for biasing the carbon brush into constant wiping engagement with the commutator. In some instances a shunt has been used to carry current to or from the brush, while the helical spring serves only in a biasing capacity. On the other hand, where the helical spring is conductive with a suitably low resistance, the shunt may be disposed with and the spring itself used to carry the current.

However, a number of problems are presented in situations where the spring serves a dual capacity as conductor and biasing device. Perhaps the most significant problem is in maintaining intimate electrical contact between the spring and the brush. Such contact is made difficult because of the brittle, granular nature of the carbon brush and the fact that an exceptional amount of vibration often exists in and around the brush assembly, therefore tending to shake or dislodge the spring from its proper contact with the brush.

Various attempts have been made to improve the degree of contact maintained between the spring and the brush, such as providing the spring with turns of reduced diameter at its tip which are frictionally received within a cavity in the brush. This is less than satisfactory, however, because the turns of the spring, including those at its tip, tend to expand or "balloon" under compressive loading so that the walls of the cavity in the brush are weakened, thereby decreasing the intimate contact of the spring tip therewith.

Moreover, the size of the cavity is controlled by the thickness of the carbon brush and, in many instances, may be such that the walls of the cavity are too thin to withstand the combined action of the outwardly expanding turns and the ever present vibrational forces. In addition, this method of securing the spring to the brush essentially prevents the brush and spring from being packaged as an assembly, since the spring is not under compressive loading while in a packaged condition and the frequent rough handling of the assembly would tend to work the spring tip out of the cavity in the brush.

Other attempts at increasing intimate contact between the spring and brush have included the use of a projection or stub on the brush which is received and gripped by reduced diameter turns at the tip end of the spring. However, this arrangement is still susceptible to the problems associated with "ballooning" of the spring under compression so that the reduced diameter turns tend to loosen about the stub on the brush once the assembly is installed. While this arrangement facilitates packaging of the assembly because of the ability of the reduced diameter turns gripping the stub to withstand rough handling associated with packaging and transport, a distinct disadvantage is created because the "active" length of the spring (the larger diameter portion behind the reduced tip) is decreased in order to provide space in the assembly housing for the reduced diameter turns. That is, within the fixed spacing of a housing for the brush assembly, in order to provide reduced diameter turns at the tip of the spring, the active length thereof consisting of its larger diameter turns must necessarily be reduced in length. This correspondingly reduces the biasing force applied to the brush, hence decreasing the mechanical stability of the brush and subsequently impairing the continuity of electrical contact between the brush and the commutator.

In view of the shortcomings of previous brush assemblies, it is an important object of the present invention to provide a helical or coil spring which may be used as a component of such an assembly having an inversely extending series of inner turns within the outer turns of the spring, which inner turns may receive and tightly retain a mounting projection on the brush of the assembly. As a result of the inverse turns, the active length of the spring within a given space may be increased beyond that available in certain of the prior art springs such that mechanical stability of the brush is enhanced and continuity of electrical contact is maintained.

As a corollary to the foregoing, an important object of the present invention is to provide a helical spring having a series of inverse, inner turns for mounting purposes such that compressive loading on the spring is borne by the outer turns of the spring alone, eliminating ballooning of the inverse turns whereby intimate electrical contact between the inverse turns and the mounting projection of the brush is always maintained.

Another important object of the present invention is to provide a unique helical spring having inverse, inner turns which accomplish a sufficiently high degree of electrical contact with the mounting projection of the brush to eliminate the need for a wire shunt, thereby significantly decreasing the cost of the brush assembly.

An additional important object of the invention is the provision of a helical spring having inverse, inner turns which grip the mounting projection of the carbon brush with sufficient tenacity to remain fully assembled and in intimate electrical contact during rough handling encountered when the spring and brush are packaged as a complete assembly.

Yet another important object of the invention is the provision of a special spring which, by virtue of its inverse, inner turns and a mounting leg associated therewith, facilitates assembly of the spring and the carbon brush by threading of the inverse turns onto and around the mounting projection on the brush.

A still further important object of the instant invention is to provide a method and apparatus for use in forming a special spring equipped with a series of inner, inverse turns.

In addition to the foregoing object, it is an important object to provide a method and apparatus for use in assembling the brush and spring as well as forming the spring.

As a corollary to the two preceding objects, another important aim of this invention is to provide a novel mandrel assembly for use in forming the special spring which provides precision control of both the outer and inner, inverse turns of the spring during formation thereof so that springs of constantly uniform force characteristics may be produced.

In the drawings:

FIG. 7 is a fragmentary, cross-sectional view of the spring forming apparatus with the mandrel assembly bottomed against the pressure plate to fully retract the extensible inner spindle;

FIG. 8 is a fragmentary, cross-sectional view of the apparatus taken along line 8—8 of FIG. 7;

FIG. 9 is a bottom plan view of the mandrel assembly;

FIGS. 10–15 are essentially diagrammatic views illustrating steps in the formation of the spring of the brush assembly; and FIGS. 16–18A are essentially diagrammatical views illustrating steps in the assembly of the spring and the carbon brush.

THE BRUSH ASSEMBLY

Figure 1:
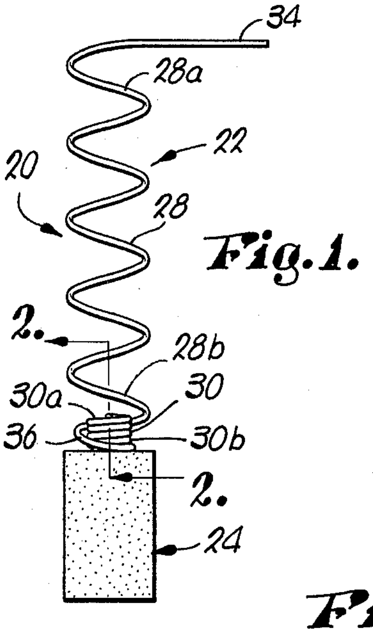
FIG. 1 is an elevational view of a brush assembly constructed in accordance with the principles of the present invention.
Figure 2:
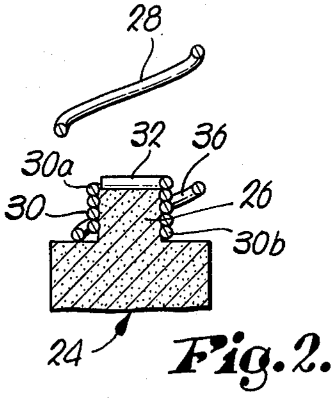
FIG. 2 is an enlarged, fragmentary, cross-sectional view of the assembly taken along line 2—2 of FIG. 1.
Figure 3:
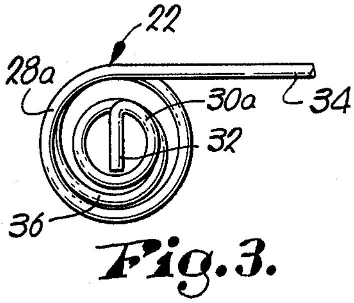
FIG. 3 is an enlarged, top plan view of the spring of the assembly.

Referring initially to FIGS. 1–4, the brush assembly of the present invention is denoted broadly by the numeral 20 and comprises a specially configured helical spring 22 firmly secured to a carbon brush or block 24. As shown best in FIG. 2, the brush 24 has a mounting projection 26 which, in the embodiment illustrated, is cylindrical in configuration, although it will be appreciated that projection 26 may assume any one of assorted shapes and sizes without impairing the principles of this invention. Spring 22 is provided with a series of side-by-side, outer turns 28 which are of one predetermined diameter and serve primarily a biasing function for spring 22, and a series of inversely extending, inner turns 30, which are more closely spaced than turns 28, are of lesser diameter than turns 28 and serve to firmly mount the spring 22 on projection 26 of brush 24.

The inner diameter of the uniform inverse turns 30 should be correlated closely with the outer diameter of projection 26 so that a tight fit of turns 30 about projection 26 may be maintained. In this regard, it is preferred that the inside diameter of turns 30 be only a few thousandths of an inch smaller than the outer diameter of projection 26. The material chosen for spring 22 must have the required elasticity for performing properly during operation and also must exhibit low resistance. Accordingly, certain alloys of phosphorous and bronze, as well as copper and beryllium, may be suitable for this purpose.

The spring 22 is, of course, a single strand of material having one end formed in a transversely extending, straight leg 32 adjacent the first turn 30a of the inverse turns 30 against the outermost end of projection 26, and the opposite end formed in a "pigtail" 34 adjacent the last of the outer turns 28. The inverse turns 30 are concentric with outer turns 28 and lead in a counterclockwise direction viewing FIG. 3, from leg 32 toward the last turn 30*b* of the turns 30 in the series. The outer turns 28 also lead in a counterclockwise direction, viewing FIG. 3, from the first turn 28*b* to the last turn 28*a*, but it is to be understood that the inverse turns 30 spiral in one axial direction, while the outer turns 28 spiral in the opposite axial direction.

Figure 4:
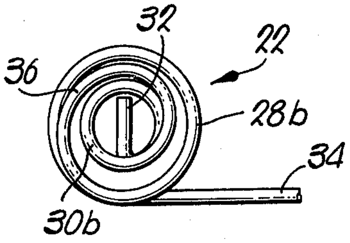
FIG. 4 is an enlarged, bottom plan view of the spring.
Figure 5:
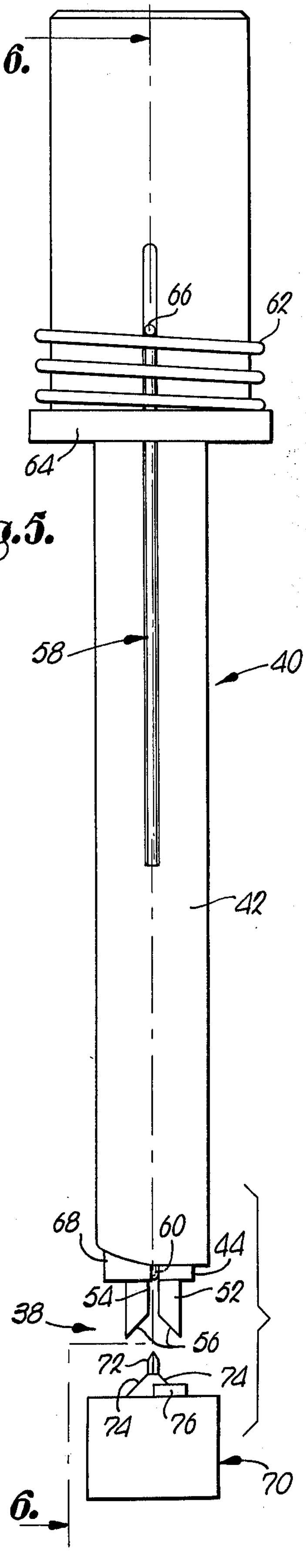
FIG. 5 is an elevational view of apparatus for forming the spring of the assembly including a mandrel assembly and an associated pressure plate.
Figure 6:
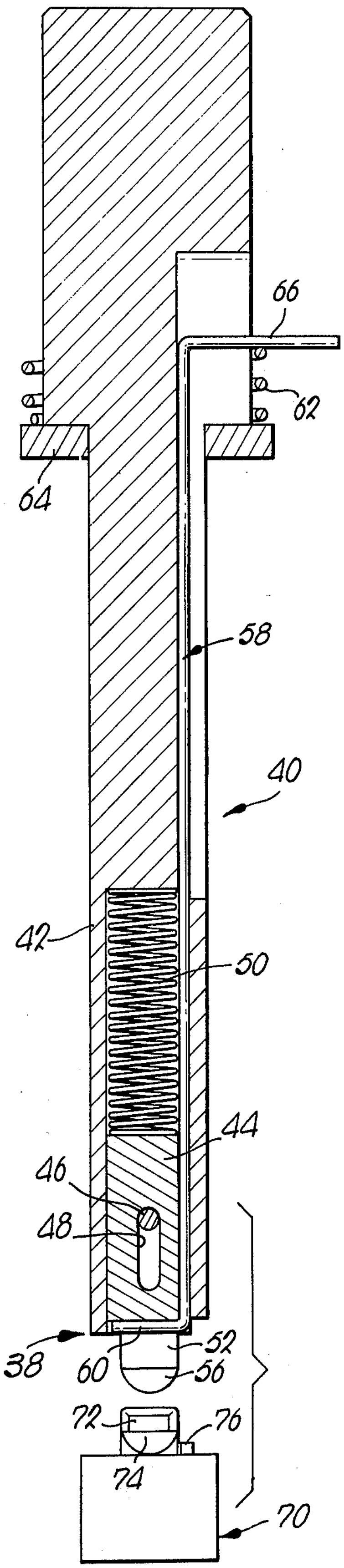
FIG. 6 is a cross-sectional view of the apparatus of FIG. 5 taken along line 6—6 thereof.

In order to reverse the direction of axial spiraling of spring 22, a spring portion 36 of progressively increasing diameter is provided which leads from te last inverse turn 30*b*. Portion 36 is concentric to turns 28 and 30, is spiraled for approximately 360° as shown in FIG. 4, and leads in the same axial direction as turns 28. As shown best in FIGS. 1 and 2, portion 36 makes the primary physical contact with the flat area of brush 24 beside projection 26 such that the "active" length of spring 22 includes all of the outer turns 28 and the portion 36, but not the inverse turns 30.

When the brush assembly 20 is placed within a holder (not shown) in the selected machine, the end of brush 24 opposite the spring 22 is disposed in wiping engagement with the commutator of the machine and is spring-loaded into such engagement by the spring 22 which works against the opposite end of the holder. By virtue of the inverse turns 30, the area of spring 22 which expands when compressed consists only of the "active" length of spring 22 including turns 28 and portions 36 as above set forth. Positioning the inverse turns 30 within the central area defined by outer turns 28 and connecting portion 36 means that turns 30 will not be effected by the compressive forces transmitted through the active length of spring 22. Instead, inverse turns 30 are free to perform their gripping functions as they encircle and tightly retain projection 26. Therefore, not only is the mechanical connection between the spring 22 and brush 24 maintained, but the intimate electrical connection therebetween is maintained as well.

The close spacing of inverse turns 30 is desirable because greater surface area of spring 22 will thereby be exposed and in contact with brush projection 26. The connection at this location is therefore enhanced both mechanically and electrically, and the close spacing of turns 30 allows the latter to act as fine threads which cut into projection 26 when spring 22 is assembled with brush 24 as will hereinafter be described in detail.

APPARATUS FOR FORMING SPRING 22

With references to FIGS. 5–9, apparatus denoted broadly by the numeral 38 is illustrated for use in forming spring 22. Apparatus 38 is adapted to be utilized in connection with a standard torsion winding machine, preferably numerically controlled, such as provided by the Torin Corporation, Torrington, Connecticut.

One major component of apparatus 38 comprises a mandrel assembly 40 having a partially hollow, outer spindle 42 which telescopically receives an inner spindle 44. Inner spindle 44 is axially shiftable within the central bore of spindle 42 between the limits established by a cross pin 46 on outer spindle 42 which extends into an elongated slot 48 in spindle 44. A compression spring 50 between the inner end of spindle 44 and an abutment of spindle 42 yieldably biases inner spindle 44 toward its normal, projected position illustrated in FIGS. 5 and 6.

The lowermost tip 52 of inner spindle 44 has an axially extending cross slot 54 therein, and a flared entry is presented to slot 54 by virtue of inclined, converging surfaces 56 on tip 52.

An axially shiftable ejector member 58 of mandrel assembly 40 is contained within a suitable channel within spindle 42 and has an ejector foot 60 at one end thereof which extends transversely of assembly 40 into slot 54 of spindle 44. The foot 60 is biased against the bottom of slot 54 by virtue of a compression spring 62 about the upper end of spindle 42 between a shoulder 64 and a handle 66 on ejector 58. An arcuate camming or guiding section 68 at the lower end of outer spindle 42 progressively increases in radius from the inside diameter of spindle 42 to the outside diameter thereof and extends approximately 180°.

Apparatus 38 also includes special pressure plate structure 70 which is mechanically separate from mandrel assembly 40 but operates in conjunction therewith for controlling the extension of inner spindle 44 and for assisting otherwise in the formation of spring 22. Plate 70 has an upstanding key 72 which is complementally receivable within slot 54 of spindle tip 52 to interlock mandrel assembly 40 and plate 70 for rotation in unison. Mating inclined surfaces 74 adjacent opposite sides of key 72 for surfaces 56 on tip 52 facilitate interlocking of assembly 40 and plate 70.

Partially encircling key 72 (approximately 180°) and surfaces 74 about the base of the latter is an upstanding, arcuate guiding or camming segment 76 having a progressively increasing radius. Initially, the radius of segment 76 corresponds substantially to the diameter of tip 52 as shown best in FIG. 8, while at its largest radius, segment 76 corresponds closely to the smallest radius of section 68 of spindle 42. Viewing FIG. 8, it may be seen that when a key 72 is properly locked within slot 54, the segment 76 and section 68 describe a substantially 360° spiral having a progressively increasing diameter as the outer surface of spindle 42 is approached.

OPERATION OF APPARATUS 38

FIGS. 10–18A illustrate steps in the formation of spring 22 and the assembly of spring 22 with brush 24. As above set forth, apparatus 38 is adapted for use in a standard torsion winding machine provided with means for shifting mandrel assembly 40 and pressure plate 70 toward and away from one another, as well as for rotating mandrel assembly 40 and allowing plate 70 to rotate therewith. Suitable feeder mechanism, such as shown schematically in FIGS. 10–18A and denoted by the numeral 78, is provided on the winding machine for supplying a wire strand 80 at a constant rate to the apparatus 38. As will be appreciated from the following description, only the relative movements of feeder 78 and apparatus 38 are important, while the specific direction of movement of each of these components taken alone is not the limiting factor. It could well be that feeder 78 shifts axially relative to mandrel assembly 40 while the latter is held stationary, except for rotation, during such shifting of feeder 78. Or, feeder 78 could be of a fixed nature with mandrel assembly 40 shiftable axially therepast during winding. As long as equivalent relative motion is obtained, either situation may be satisfactory. Also for purposes of clarity and by way of example, feeder 78 will hereinafter be described as stationary, while mandrel assembly 40 and pressure plate 70 are movable axially therepast.

As shown in FIG. 10, pressure plate 70 and mandrel assembly 40 are initially spaced apart with inner spindle 44 fully extended and key 72 aligned with slot 54. The leading end of strand 80 is introduced by feeder 78 into slot 54 below foot 60 of ejector 58, whereupon pressure plate 70 is shifted upwardly as shown in FIG. 11 to clamp the leading end of strand 80 between foot 60 and key 72. Mandrel assembly 40 is then rotated as shown in FIG. 12, while pressure plate 70 continues to move toward assembly 40 thereby progressively pushing spindle 44 into outer spindle 42 while plate 70 rotates with assembly 40.

Rotation of inner spindle 44 as part of assembly 40 while spindle 44 is progressively retracted causes strand 80 to be coiled about tip 52 down the latter, producing the inverse turns 30. It will be recognized that the rate of retraction of spindle 44 by pressure plate 70 controls the spacing between turns 30 at this stage of the operation.

When the condition illustrated in FIGS. 12, 12A and 12B is presented, the final turn 30*b* of inverse turns 30 is completed and strand 80 is just ready to begin forming connecting portion 36 by winding about segment 76. At this point, assembly 40 and pressure plate 70 are shifted in unison in the direction opposite to the initial shifting of plate 70 such that strand 80 not only grows in diameter as it winds about segment 76, but it now begins to wind up assembly 40 instead of down assembly 40 during formation of inverse coils 30. As shown in FIGS. 13 and 13A, when the first growth of strand 80 has been completed about segment 76, the second growth is ready to begin about section 68 on outer spindle 42. The growth of strand 80 continues until the largest radius of section 68 is approached as shown in FIGS. 14 and 14A, whereupon continued downward shifting of the rotating assembly 40 causes the outer turns 28 to be produced as strand 80 climbs the outside of spindle 42.

It will be appreciated that the spacing between turns 28 is determined by the rate of downward shifting of assembly 40, and the specific rate of such downward feed is not critical, although it is desirable that it be greater than that previous speed of retraction of spindle 44 so that turns 28 are spaced a greater distance apart than inverse turns 30.

After approximately half of the outer turns 28 have been produced, the pressure plate 70 may be backed away from the downwardly shifting assembly 40 as shown in FIG. 15, and the tension of strand 80 alone will maintain inner spindle 44 retracted. As the final half of turns 28 is formed, assembly of the brush 24 with spring 22 may be commenced by aligning the brush 24 concentrically with assembly 40 as shown in FIG. 16. When turns 28 have been completed, brush 24 may be positioned directly under inverse turns 30 as shown in FIG. 17, and strand 80 severed adjacent feeder 78 to thereby extend inner spindle 44. Subsequent rotation of assembly 40 in the opposite direction, coupled with simultaneous depression of ejector 58 by its handle 66, as illustrated in FIGS. 18 and 18A, causes turns 30 to be threaded onto and about projection 26 until leg 32 strikes the end of projection 26, whereupon the completed assembly 20 may be withdrawn from the winding machine.

It is important to note that leg 32 formed by the leading end of strand 80 in slot 54 not only facilitates formation of spring 22, but also allows the latter to be readily assembled with brush 24. Without the provision of leg 32, spring 22 would be free to spin loosely about mandrel assembly 40 when an opposite rotative force was applied to the latter, thereby precluding threading of inverse turns 30 onto projection 26. Moreover, leg 32 provides means against which the foot 60 of ejector 58 may operate when ejector 58 is actuated.

Having thus described the invention, what is claimed as new and desired to be secured by Letters patent is

1. An electrical brush assembly comprising:

a brush of electrically conductive material having a mounting projection; and a helical compression spring attached to said brush, said spring comprising a single, spiralled strand of material formed into a first longitudinal series of outer turns of one diameter which defines an elongated cylindrical space within said turns extending from one end of said first series to the opposite end thereof, said strand further being formed into a second series of inner turns smaller in diameter than said outer turns which securely receives said projection inside said cylindrical space at all times, whether the spring is compressed or uncompressed, said inner turns of the single strand being integrally joined to the outer turns, being disposed wholly within said space, and extending from said one end of the first series toward the opposite end thereof.

2. An electrical brush assembly as claimed in claim 1, wherein said outer turns spiral in one axial direction and said inner turns spiral in the opposite axial direction.

3. An electrical brush assembly as claimed in claim 1, wherein said spring is constructed from an electrically conductive material.

4. An electrical brush assembly as claimed in claim 1, wherein said inner turns are closely spaced about said projection.

5. An electrical brush assembly as claimed in claim 1, wherein said projection has an outermost end, said series of inner turns having a transversely extending mounting leg lying against said end of the projection.

6. An electrical brush assembly as claimed in claim 1, wherein said projection and said turns are concentric with one another.

* * * * *